United States Patent
Lerch et al.

(10) Patent No.: US 7,353,129 B2
(45) Date of Patent: Apr. 1, 2008

(54) ALTIMETER HAVING TEMPERATURE CORRECTION

(75) Inventors: Erich Lerch, Neuenkirch (CH); Peter Joder, Kriens (CH)

(73) Assignee: Flytec AG (CH)

( * ) Notice: Subject to any disclaimer, the term of this patent is extended or adjusted under 35 U.S.C. 154(b) by 204 days.

(21) Appl. No.: 10/544,815

(22) PCT Filed: Jan. 27, 2004

(86) PCT No.: PCT/CH2004/000041

§ 371 (c)(1),
(2), (4) Date: Sep. 20, 2005

(87) PCT Pub. No.: WO2004/070317

PCT Pub. Date: Aug. 19, 2004

(65) Prior Publication Data

US 2006/0106559 A1    May 18, 2006

(30) Foreign Application Priority Data

Feb. 6, 2003    (CH) .................................... 0184/03

(51) Int. Cl.
*G01C 17/38*    (2006.01)
*G01P 21/00*    (2006.01)
(52) U.S. Cl. ......................................... 702/94; 702/97
(58) Field of Classification Search .................. 702/94, 702/97–99, 130, 138, 166
See application file for complete search history.

(56) References Cited

U.S. PATENT DOCUMENTS 5,224,059 A  *  6/1993  Nitta et al. ................... 73/384
6,216,064 B1    4/2001  Johnson et al. ................ 701/4
6,266,583 B1    7/2001  Tazartes et al. ................ 701/4

FOREIGN PATENT DOCUMENTS

EP      0 345 929      12/1989
GB      1 214 906      12/1970

OTHER PUBLICATIONS

International Search Report PCT/CH2004/000041 dated Apr. 15, 2004.

* cited by examiner

*Primary Examiner*—Michael Nghiem
(74) *Attorney, Agent, or Firm*—Ostrolenk, Faber, Gerb & Soffen, LLP

(57) ABSTRACT

According to the invention, a climate-related, or to be precise, a temperature-related correction of the altitude reading is carried out on an altimeter. In doing this, the measurement of altitude is based on an average reference temperature value at sea level and on an average air pressure reference value at sea level according to the U.S. Standard Atmosphere 1976. The correction ensues by altering the reference temperature at sea level. A correction is then carried out when the temperature prevailing at a certain altitude above sea level differs from the temperature reference value for this altitude. This temperature reference value results at sea level based on the average temperature reference value.

12 Claims, 4 Drawing Sheets

Winter quarter

Summer quarter

| Altitude above AMSL [meter] | Temperature according to CINA and U.S. Standard 1976 [°C] | Standard pressure according to CINA and U.S. Standard 1976 [hPa] |
|---|---|---|
| 0 | 15.00 | 1013.25 |
| 200 | 13.70 | 989.45 |
| 400 | 12.40 | 966.11 |
| 600 | 11.10 | 943.22 |
| 800 | 9.80 | 920.76 |
| 1000 | 8.50 | 898.75 |
| 1200 | 7.20 | 877.16 |
| 1400 | 5.90 | 855.99 |
| 1600 | 4.60 | 835.24 |
| 1800 | 3.30 | 814.89 |
| 2000 | 2.00 | 794.95 |
| 2400 | -0.60 | 756.26 |
| 2800 | -3.20 | 719.10 |
| 3000 | -4.50 | 701.09 |
| 3400 | -7.10 | 666.15 |
| 3800 | -9.70 | 632.64 |
| 4000 | -11.00 | 616.40 |
| 4500 | -14.25 | 577.28 |
| 5000 | -17.50 | 540.20 |
| 5500 | -20.75 | 505.07 |
| 6000 | -24.00 | 471.81 |

ALTIMETER HAVING TEMPERATURE CORRECTION

CROSS REFERENCE TO RELATED APPLICATIONS

The present application is a 35 U.S.C. § 371 national phase conversion of International Application No. PCT/CH2004/000041 filed 27 Jan. 2004, which claims priority from Swiss patent application No. 184/03 filed 6 Feb. 2003.

BACKGROUND OF THE INVENTION

The present invention relates to a method for correcting as a function of climate and/or temperature the altitude reading on an altitude measuring device, and to an altimeter operating in accordance with the functional principle of the method, and to a method for measuring altitude by using the method according to the invention.

The development of electronic altimeters having silicon-based pressure sensors permits even inexperienced mountain walkers to carry along an altimeter such as, for example, the altimeter from Victorinox, CH-6438 Ibach.

Altimeters calculate the appropriate altitude on the basis of atmospheric pressure. In order to adapt to the diurnal air pressure fluctuations, these units therefore have to be recalibrated in each case before use. To achieve acceptable functioning, it is necessary for the current altitude such as, for example, at home, at the foot of a hill/mountain, at the start of a ramble, etc. to be input anew daily.

This input can also be accomplished by an unpracticed user. The correction of the temperature profile against altitude is a difficult one. Many different possibilities for correcting the temperature profile are proposed by those marketing such altimeters, for example including Thommen, CH-4437 Waltenburg, and in the book entitled "Wetterkunde für Wanderer und Bergsteiger" ["Meteorology for Ramblers and Mountaineers"] by Peter Albisser, published by SAC Verlag, 3000 Bern, edition 2001.

The proposed methods are generally relatively complicated and also do not always lead to good results, because the air can be layered in a complex fashion.

SUMMARY OF THE INVENTION

The object of the present invention is therefore to search for a possibility that permits a simple use and ensures a correction of adequate quality in most cases.

In the invention described below, it is assumed that virtually all altimeters operate in accordance with U.S. Standard Atmosphere 1976, published by the National Geophysical Data Center, Boulder, Colo., USA. This standard atmosphere is based on a pressure of 1013.25 hPa and a temperature of 15° C. at sea level at mid-latitudes. By contrast, the average pressure in Switzerland is 1017 hPa, referred to sea level, for example SMA Meteo Schweiz AG.

The above named object is achieved on the basis of the outlined presupposition by means of a method in accordance with the invention. What is proposed is a method for correcting the altitude reading on an altimeter as a function of climate and/or temperature, in that the altitude is determined on the basis of an average reference temperature value at sea level and an average air pressure reference value at sea level and the correction is performed by altering the reference temperature at sea level.

Consequently, on the basis of the above-mentioned presupposition, the correction is performed in that the determination of altitude performed on the basis of the U.S. Standard Atmosphere 1976 is corrected by altering the reference temperature at sea level.

As mentioned, the assumption is an average reference temperature at sea level of 288.15°K corresponding to approximately 15° C., and an average reference pressure of approximately 1013 mb. The correction of the average reference temperature value is performed when the temperature prevailing at a specific altitude above sea level deviates from the reference temperature for this altitude resulting with reference to the average temperature reference value at sea level.

In accordance with a preferred variant embodiment, the sea level temperature reference value is elevated by at least approximately 6° C. or 6° K if the temperature determined or measured at a specific altitude is at least approximately 4° C. higher than the temperature reference value valid for this altitude.

Correspondingly, the sea level temperature reference value is corrected downward by at least approximately 4° C. or 4° K, preferably by at least approximately 6° C. or 6° K for the altitude determination if the temperature value determined or measured at a specific altitude is lower by at least 4° C. than the temperature reference value valid for this altitude.

The methods defined according to the invention are suitable, in particular for temperature-related correction on an altimeter that operates according to the U.S. Standard Atmosphere 1976. It is possible here for the altimeter to have three setting stages for the altitude reading, specifically a reading for downwardly deviating temperature compared with a reference temperature for this altitude where a measurement takes place, a normal setting if no temperature deviation is established, and a setting for elevated temperature, that is to say where the ambient temperature is above the respective temperature reference value.

It is, of course, also possible to provide further stages such as, for example, a correction for slight temperature deviation downward or upward, and one setting each for strong downward and upward temperature deviation and, of course, a setting for the situation where the ambient temperature corresponds approximately to the reference value for this altitude.

Finally, a method is proposed for measuring altitude by firstly setting or calibrating the altimeter to the altitude above sea level established at this location, for example when starting to ramble or at the foot of a hill/mountain. This ensures that pressure deviations from standard pressure that prevail on a specific day are at least partially taken into account. This calibration is known per se and is already normally undertaken today when starting to ramble or beginning some other undertaking such as a car journey.

After the ascent or after carrying out a journey such as, for example, by means of a vehicle, the effective altitude measurement is then undertaken and it is simultaneously established whether the outside temperature measured at the respective altitude corresponds approximately to the reference value for this altitude, whether the temperature is much too low or much too high. Usually, the temperature is, rather, too low in winter, while in summer excessively high temperatures prevail as a rule. The temperature conditions established or estimated are set on the unit.

The invention will be explained in more detail with the aid of the following examples and with reference to the attached figures.

The following considerations were examined on the basis of balloon soundings from the measuring station at Payern and verified with the aid of weather data from SMA Meteo Schweiz.

The altitude was set exactly as with a simple altimeter. According to the invention, it is now newly possible to make a temperature-related setting. The latter is based fundamentally on the fact that warm air expands and therefore the air column is higher, something which leads to a raised pressure at a specific altitude. The altimeter indicates too low an altitude. It appears on an altimeter as if the decrease in altitude takes place more slowly than for an air column having established temperature according to U.S. Standard 1976. This weather setting already had to be made even with older mechanical units; it is now being automated.

This weather setting could be done, for example, even in a set menu, but it is more difficult there, that is to say can be reached via a number of key depressions, and is therefore mostly forgotten. Correspondingly, according to the invention, and as proposed with reference to FIG. 1, the user is to be offered the simplest possible manipulation so that he can undertake the weather-related and/or temperature-related correction on the altimeter as simply as possible.

DESCRIPTION OF A PREFERRED EMBODIMENT

Figure 1:
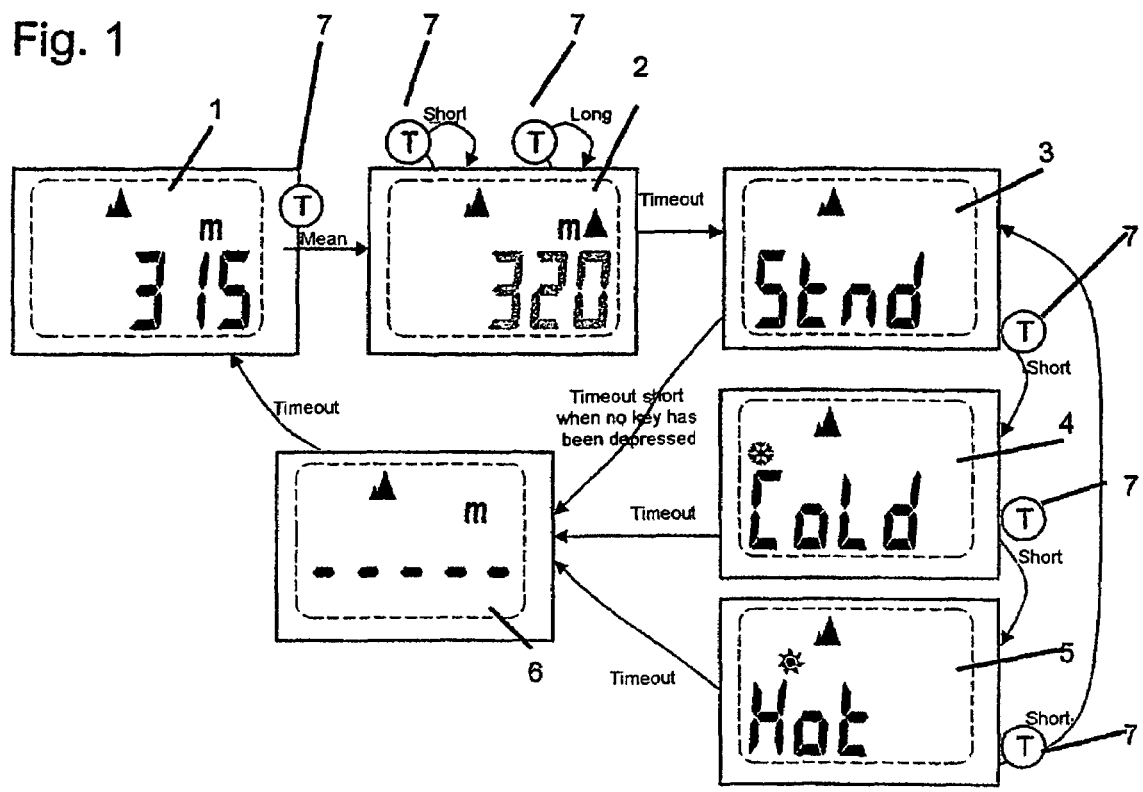
FIG. 1 Schematic depiction of the method of the invention.

With reference to FIG. 1, which is a schematic of the method according to the invention, the altimeter is calibrated at an original position A, for example at the start of day or starting on a journey or starting to ramble, the display 1 indicating the old altitude at the starting or original location, which is now no longer accurate, for example because of a change in air pressure. In order to bring the reading on the altimeter into agreement with the correct geometric altitude, an actuating means 7, such as a key in the case when an altimeter is integrated in the pocket measuring instrument, the Swiss cross on the pocket measuring instrument is actuated whereupon the altitude reading 2 is displayed by the altimeter in uncorrected fashion. By repeatedly pressing the actuation element 7, the altitude indicated is adapted to the current altitude. Before the unit returns to indicating the current altitude, Display 1, the temperature correction mode is entered, the initial display being Display 3 "Stnd"=Standard, in which case no temperature correction is performed, but calculation is done using the standard formula according to U.S. Standard 1976. By renewed actuation of the element 7, it is possible to set the display "Cold" provided with the snow star symbol if the temperature a this location is lower than the corresponding reference temperature value. Renewed actuation of the element 7 once again brings on the display "Hot" with the sun symbol for the case in which an excessively high temperature prevails. At a certain time, automatic resetting is performed via Display 6 to the current altitude Display 1.

The proposal illustrated in FIG. 1 is such that an unpracticed user needs only set the altitude at start of day or when starting upon a trip, or calibrate an altimeter. If he does nothing, the altitude reading at the respective location is made in accordance with the calculation using U.S. Standard 1976. By simply actuating a key during the standard altitude calibration, it is possible to select the type of weather or type of temperature, and the user is alerted to the altitude correction as a consequence of temperature deviation.

Methods of Calculation:

The method of calculation for correcting the altitude reading is based on the definition of the U.S. Standard Atmosphere 1976.

The calculation formula 33a on page 12 of the U.S. Standard Atmosphere 1976 is as follows:

$$P = P_b \cdot \left[ \frac{T_{M,b}}{T_{M,b} + L_{M,b} \cdot (H - H_b)} \right]^{\left[ \frac{g'_0 \cdot M_0}{R^* \cdot L_{M,b}} \right]}$$

U.S. Standard 1976 divides the atmosphere into 8 layers. The lowermost layer extends in this case up to an altitude of 11 km. It has the Index b=0. The formula for the lowermost 11 km is thus:

$$P = P_0 \cdot \left[ \frac{T_{M,0}}{T_{M,0} + L_{M,0} \cdot (H - H_0)} \right]^{\left[ \frac{g'_0 \cdot M_0}{R^* \cdot L_{M,0}} \right]}$$

DEFINITIONS $g_o$ 9.80665 m s$^{-2}$ Gravity acceleration at the geographic latitude □=45° and the geometric altitude z=0masl $g'_o$, 9.80665 m' s$^{-2}$ Numerically equal to $g_0$. However, it [?] the geopotential altitude in accordance with the definition of h.

Universal gas constant (R*M)
R*=R$_{star}$ 8.31432*10$^3$Nm kmol$^{-1}$K$^{-1}$ $$M_0 = \frac{\sum F_i \cdot M_i}{\sum F_i}$$

in accordance with Table 3 page 3 U.S. Standard Atmosphere $M_0$ 28.964425 kg kmol−1 Relative molecular mass of dry air $T_0$, $T_{M,0}$ 288.15 K Temperature of dry air at the geometric altitude 0masl in accordance with Definition U.S. Standard 1976 page 4. This definition is based on a resolution of the Commission Internationale de Navigation Aérienne CINA (International Commission for Air Navigation ICAN) of 1924

γ, $L_{M,0}$ −6.50*10−3 K m−1 Temperature gradient of the polytropic atmosphere up to 11 km altitude h, H gpm, m' Geopotential altitude, that is to say that height by which a mass of 1 kg in the gravity field of the earth must be raised so that its potential energy increases by 9.80665 Nm. an m' changes its geometric length as a function of the acceleration of gravity g at different altitudes. The differences are, however, so small that they can be neglected for normal calculations.

$H_0$ 0 m Sea level
$P_o$, $P_0$ 1013.25 hPa Standard pressure at z=0masl
p, P hPa Air pressure at the geopotential altitude h [masl]

The formula is thus recast as:

$$p = p_0 \left[\frac{T_0}{T_0 + \gamma \cdot h}\right]^{\left[\frac{g_0 \cdot M_0}{R^* \cdot \gamma}\right]}$$

$$\frac{p}{p_0} = \left[\frac{T_0}{T_0 + \gamma \cdot h}\right]^{\left[\frac{g_0 \cdot M_0}{R^* \cdot \gamma}\right]}$$

$$\frac{p}{p_0}^{\left[\frac{R^* \cdot \gamma}{g_0 \cdot M_0}\right]} = \left[\frac{T_0}{T_0 + \gamma \cdot h}\right]$$

$$\left[\frac{T_0}{T_0 + \gamma \cdot h}\right] = \frac{p}{p_0}^{\left[\frac{R^* \cdot \gamma}{g_0 \cdot M_0}\right]}$$

$$\left[\frac{T_0 + \gamma \cdot h}{T_0}\right] = \left[\frac{p}{p_0}\right]^{\left[\frac{R^* \cdot \gamma}{g_0 \cdot M_0}\right]}$$

$$\left[1 + \frac{\gamma \cdot h}{T_0}\right] = \left[\frac{p}{p_0}\right]^{\left[\frac{R^* \cdot \gamma}{g_0 \cdot M_0}\right]}$$

$$\frac{\gamma \cdot h}{T_0} = -1 + \left(\frac{p}{p_0}\right)^{\left[\frac{R^* \cdot \gamma}{g_0 \cdot M_0}\right]}$$

$$h = -\frac{T_0}{\gamma}\left(1 - \left(\frac{p}{p_0}\right)^{\left[\frac{R^* \cdot \gamma}{g_0 \cdot M_0}\right]}\right)$$

and thus assumes the form customary in Switzerland $$h = \frac{-T_0}{\gamma} \cdot \left(1 - \left(\frac{p}{p_0}\right)^{\frac{-R^* \cdot \gamma}{g_0 \cdot M_0}}\right)$$

with the above values substituted $$h = \frac{288.15}{0.0065} * \left(1 - 5.255\sqrt{\frac{p}{p_0}}\right)$$

The temperature correction is now performed in accordance with the present invention using the following formula:

$$h = \frac{-T_0 + \Delta T}{\gamma} \cdot \left(1 - \left(\frac{p}{p_0}\right)^{\frac{-R^* \cdot \gamma}{g_0 \cdot M_0}}\right)$$

or $$h = \frac{288.15 + \Delta T}{0.0065} * \left(1 - 5.255\sqrt{\frac{p}{p_0}}\right)$$

is substituted.

Figures 4, 5:
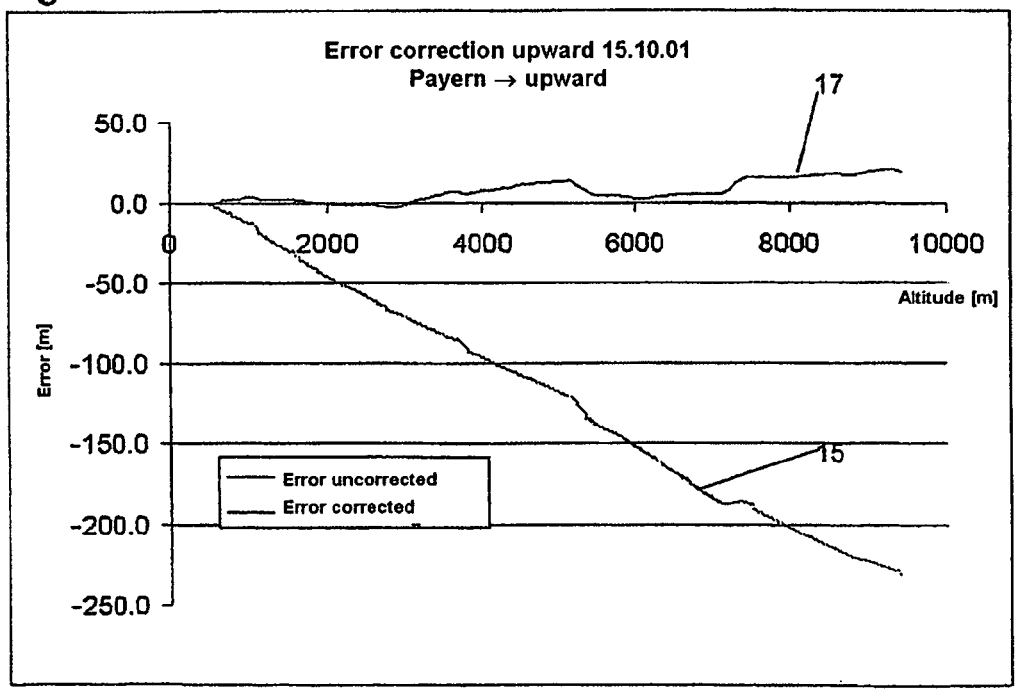
FIG. 4 table of temperature levels useful in the method of the invention.
FIG. 5 further example of application of the corrected method.

Here, $\Delta T$ is the temperature deviation in ° C. from the setpoint in accordance with FIG. 4. This value can be positive or negative. The method assumes that the layers of air above the observer up to approximately 11 km altitude are too cold or too warm as a whole. This is not always the case. The configuration of the layers of air can be complicated during the passage of fronts. The method then returns a poorer value. The evaluation of weather data by SMA Meteo Schweiz AG for 2000 has shown, however, that the assumption of excessively warm or excessively cold air masses is correct most of the time. This can be justified meteorologically in that after the passage of a front the entire atmosphere up to 11 km altitude is too warm or too cold.

It is proposed according to the invention that the value $T_o$ be replaced by a value that takes account of excessively warm or excessively cold air. In other words, a value of 288.15−$\Delta T$ or a value of 288.15+$\Delta T$ is substituted.

It has emerged according to the invention that in the case where the outside temperature deviates by more than 4° from the respective reference value, a temperature-related correction is to be undertaken, in which case a value of +6° is to be substituted in the above formula given a deviation of more than +4° $\Delta T$, and a value of −6° is to be substituted given a deviation of more than −4° $\Delta T$.

The effectiveness of the correction is to be explained in more detail with the aid of the diagrams in FIGS. 2 and 3. That curve 11 with the higher amplitudes, results from a calibration at the altitude of Interlaken and an altitude measurement on the Jungfraujoch at various temperatures without correction and the curve 13, with the low amplitudes, shows the altitude measurement on the Jungfraujoch at different outside temperatures and taking account of the altitude correction.

Figure 2A:
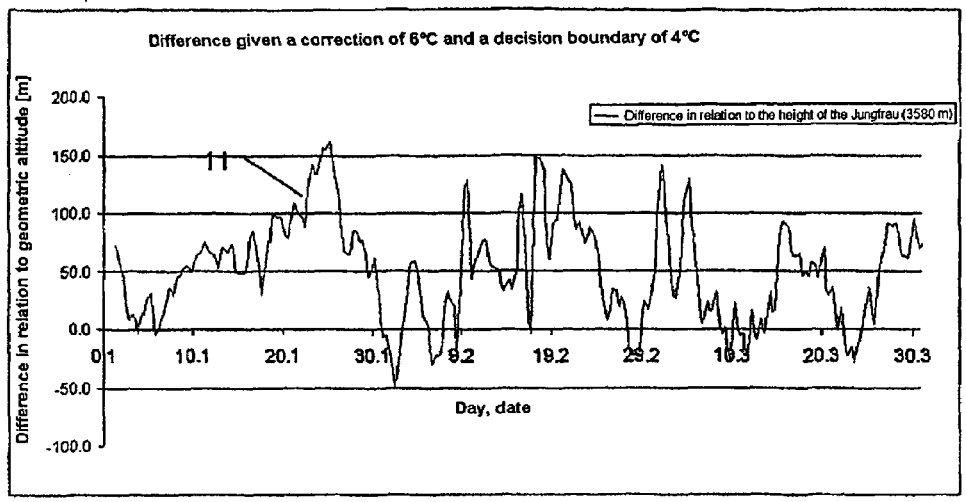
FIGS. 2a and 2b illustrate the uncorrected and corrected measuring altitude values in winter.
Figure 2B:
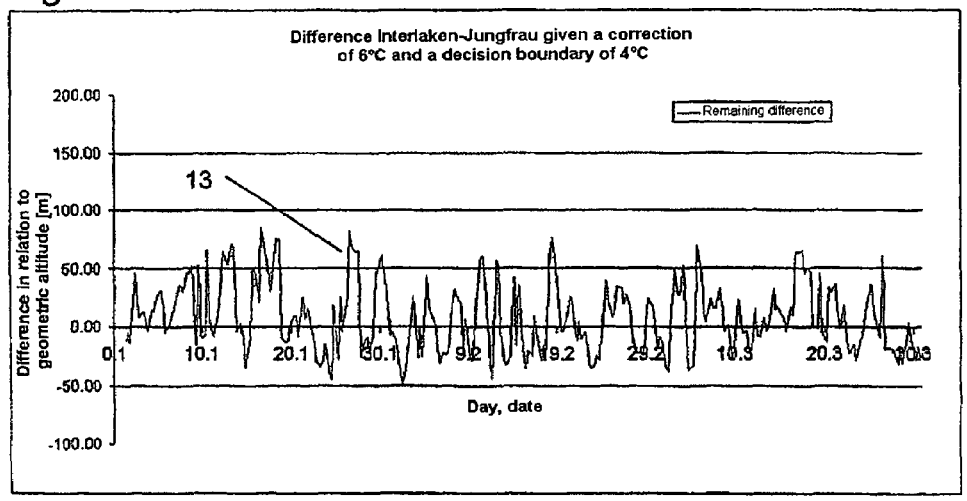

FIGS. 2a and 2b illustrate the measured values in the winter quarter, FIG. 2a illustrating the uncorrected measured altitude values, while in FIG. 2b the curve 13 represents the measured values taking account of the correction method proposed according to the invention.

Figure 3A:
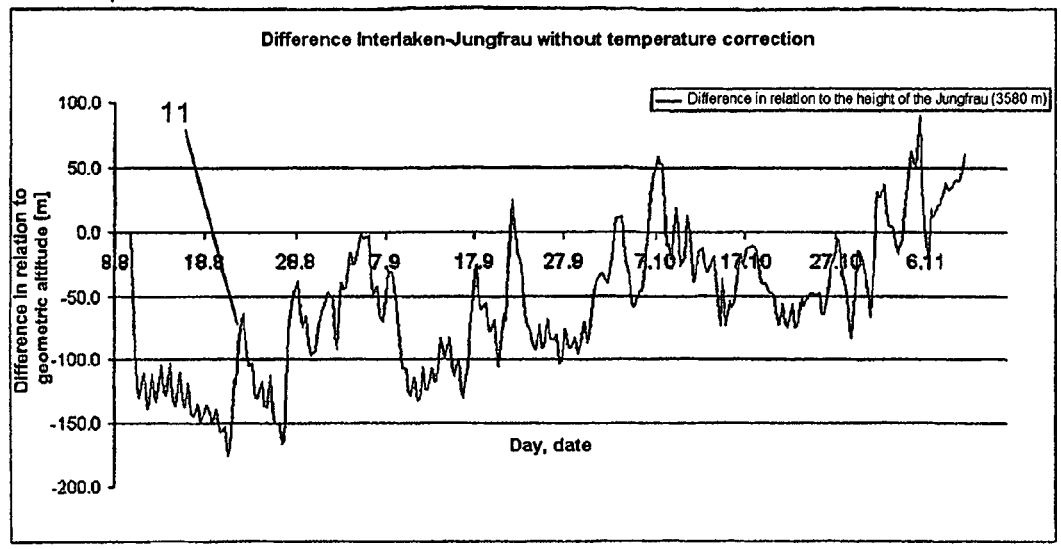
FIGS. 3a and 3b illustrate the uncorrected and corrected measuring altitude values in summer.
Figure 3B:
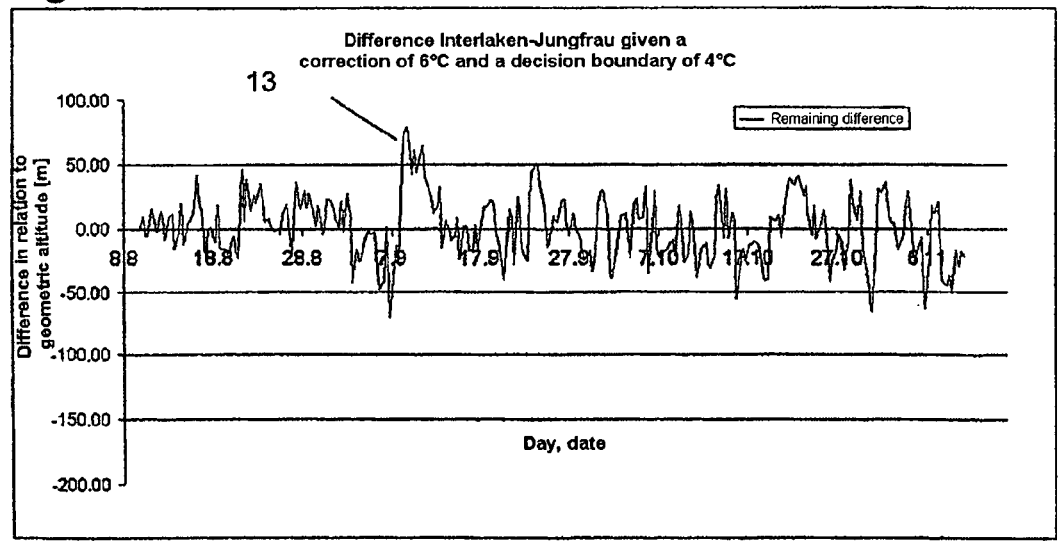

Similarly FIGS. 3a and 3b illustrate the measured values in the summer quarter, once again curve 11 in FIG. 3a representing the uncorrected values, while curve 13 in FIG. 3b illustrates the measured values while taking account of the correction method proposed according to the invention.

It is clearly shown by comparing a profile of curve 11 with that of a corresponding curve 13 that, taking account of the correction method proposed in accordance with the invention, the measured values are substantially more accurate than the measured altitude values determined or measured using the conventional measuring method.

Of course, it is basically true that there is a difficulty in measuring the exact air temperature of a layer of air. This is even virtually impossible for the unpracticed user or for the rambler. Much better is a subjective impression as to whether it is felt to be too warm or too cold by comparison with U.S. Standard. Statistics were drawn up covering the data for 2000, and the optimum value determined corresponds to the above statements, that is to say $\Delta T$ was at 6° C. given a decision boundary of 4° C.

The standard or reference values that correspond to the respective altitudes in meters above sea level can be taken from the attached table in FIG. 4. Thus, for example, a reference temperature of 8.5° and a reference pressure of 898.7 mb hold for an altitude of 1000 m above sea level. It follows that if a person is at 1000 m and the temperature is in the range of approximately 4-12°, there is no need to undertake a temperature-related correction to the altitude reading. However, if the temperature is at 0°, there is a corresponding need to take account of a $\Delta T$ value of −6°, that is to say given an appropriate menu setting it is necessary to select the reading that is valid for excessively low ambient temperatures. A corresponding statement holds for an ambient temperature of, for example, 20° C., where there is a need here to use the menu circuit in accordance with FIG. 1 to select the reading that holds for an excessively high ambient temperature.

FIG. 5 illustrates a further example of how the correction method according to the invention can be used for reliable correction of inaccurate altitude readings. Thus, measured altitude values were determined in Payern in Oct. 15, 2001 and at various altitudes by means of balloon soundings verified with the aid of weather data from SMA Meteo Schweiz. Here, curve 15 shows the altitude reading without correction, that is to say as it was indicated on the altitude measuring device calibrated in Payern. Curve 17, by contrast shows the measured values as they were verified on the basis of the temperature readings of Meteo Schweiz and as per the method according to the invention. The deviations of the readings in accordance with curve 15 increase with the increasing altitude above Payern and already return a deviation of −200 m at an altitude of 8 km, for example. By contrast, curve 17 exhibits practically no deviation from the root-mean-square value.

Although corrections carried out in the examples are based in each case on the U.S. Standard Atmosphere 1976 and are performed in accordance with the calculation mentioned advanced above, the method proposed according to the invention can also be used when other methods are applied to determine altitude. This is assuming that the starting point is a temperature reference value at sea level and an air pressure reference value at sea level. This reference value can correspondingly be corrected as proposed according to the invention by substituting a higher value in the appropriate calculation formula in the event of a higher ambient temperature, that is to say a value of 288+ΔT, and a value of 288 −ΔT in the case of a lower ambient temperature.

It is also possible, in turn, to apply a multistage method, that is to say not only one correction stage upward and one correction stage downward can be selected, as illustrated schematically in FIG. 1, but a number of correction stages can be selected. Thus, given an ambient temperature that deviates by, for example, approximately 4-6° it is possible to select a first correction of ΔT+6°, and a correction of ΔT+10° can be selected given a larger deviation of approximately 6-10°. Further stages are, of course, possible and can be varied or matched to the measurement series correspondingly carried out.

The invention claimed is:

1. A method for correcting an altitude reading on an altitude measuring device as a function of climate and/or temperature, the method comprising:
determining a first altitude based on an average reference temperature value at sea level and an average air pressure reference value at sea level;
determining as an ambient temperature a temperature at the first altitude determined at the measuring device; and
determining a corrected average reference temperature value by altering the average reference temperature value at sea level to arrive at a corrected altitude reading,
wherein the average reference temperature value at sea level is 288° K and the average air pressure reference value at sea level is 1013 mb, and the corrected average reference temperature value is determined when the ambient temperature deviates from a reference temperature value for the first altitude, the reference temperature value for the first altitude set with reference to the average reference temperature value.

2. The method as claimed in claim 1, wherein the determination of the first altitude is based on a pressure of 1013 mb at a temperature of 288° K at sea level in mid latitudes.

3. The method as claimed in claim 1, wherein the average reference temperature value at sea level is corrected upward for the corrected altitude reading by at least 6° K, if the ambient temperature is at least 4° K higher than the reference temperature value for the first altitude.

4. The method as claimed in claim 1, wherein the average reference temperature value at sea level is corrected downward by at least 6° K for the corrected altitude reading if the ambient temperature is lower by at least 4° K than the reference temperature value for the first altitude.

5. An altitude measuring device operable to correct the altitude reading according to the method of claim 1 comprising a measuring device provided for determining the altitude is connected to a circuit by means of which the temperature-related altitude correction is rendered possible.

6. The altitude measuring device as claimed in claim 5, wherein the device is operable to be set to one of at least several settings, the at least several settings including a first setting for when the ambient temperature is in the range of the reference temperature value for the first altitude, a second setting for when the ambient temperature is 4-8° C. above the reference temperature value for the first altitude, a third setting for when the ambient temperature is 6-12° C. higher than the reference temperature for the first altitude, a fourth setting for when the ambient temperature is 4-8° C. lower than the reference temperature for the first altitude, and a fifth setting for when the ambient temperature is 6-12° C. lower than the reference temperature for the first altitude.

7. The altitude measuring device as claimed in claim 5, further comprising a menu circuit operable to allow selection between at least three settings, the at least three settings being a normal ambient temperature, a low ambient temperature and a high ambient temperature.

8. A measurement method using a correction method as claimed in claim 1, wherein the altitude measuring device is calibrated at a known altitude or set to the known altitude and the ambient temperature is compared at the same time or at a later point in time with the reference temperature value for the known altitude or for an altitude to be determined later, and the altitude is corrected in case of an elevated ambient temperature or of a low ambient temperature.

9. The measurement method as claimed in claim 8, wherein the ambient temperature is measured by means of a temperature sensor arranged in the altitude measuring device, and compared with the reference temperature value for the known altitude, and in case of an elevated ambient temperature or an excessively low ambient temperature the altitude correction is performed.

10. A method for correcting an altitude reading on an altitude measuring device as a function of climate and/or temperature, the method comprising:
determining a first altitude based on an average reference temperature value at sea level and an average air pressure reference value at sea level;
determining as an ambient temperature a temperature at the first altitude determined at the measuring device; and
determining a corrected average reference temperature value by altering the average reference temperature value at sea level to arrive at a corrected altitude reading, wherein the average reference temperature value at sea level is 288° K and the average air pressure reference value at sea level is 1013 mb, and the corrected average reference temperature value is determined when the ambient temperature deviates from a reference temperature value for the first altitude, the reference temperature value for the first altitude set with reference to the average reference temperature value, wherein the determination of the first altitude is based on a pressure of 1013 mb at a temperature of 288° K at sea level in mid latitudes employing the following formula:

$$h=((T\_MH+\Delta T)/0.0065)*(1-5.255*(p/p\_O)**0.5)$$

where T_MH=the reference temperature value at sea level =288° K, and where $\Delta T = +6°$ C. when the ambient temperature is higher than the reference temperature value, and $\Delta T=-6°$ C. when the ambient temperature is lower than the reference temperature value and $\Delta T=0$ when the ambient temperature corresponds to the reference temperature value for the first altitude.

11. The method as claimed in claim 10, wherein the correction is performed in stages, such that $\Delta T$ is +6° C. or −6° C. for deviations of the ambient temperature in a range of 4-8° C. by comparison with the valid reference temperature value, and such that $\Delta T$ is greater than +6° C. or less than −6° C. in case of deviations of the ambient temperature in a range of 8-150° C. or more by comparison with the reference temperature value.

12. The method as claimed in claim 10, wherein $\Delta T$ can be selected in three or more stages for the determining of the corrected average reference temperature value in case of an elevated or lowered ambient temperature in comparison with the reference temperature value.

* * * * *